Nov. 14, 1939.     H. E. WILBER     2,180,327
CONSTANT VOLTAGE GENERATOR
Filed Sept. 19, 1936     2 Sheets-Sheet 1

INVENTOR
Harold E. Wilber
BY
Harness, Dickey, Pierce & Hanna
ATTORNEYS.

Nov. 14, 1939.  H. E. WILBER  2,180,327
CONSTANT VOLTAGE GENERATOR
Filed Sept. 19, 1936  2 Sheets-Sheet 2
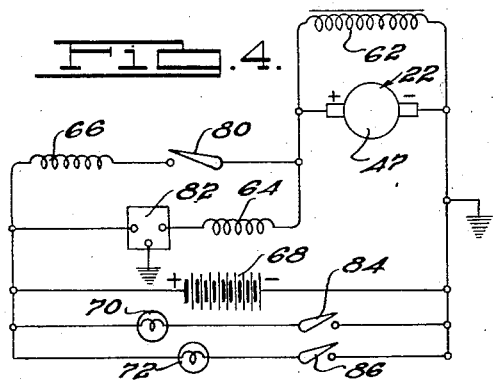
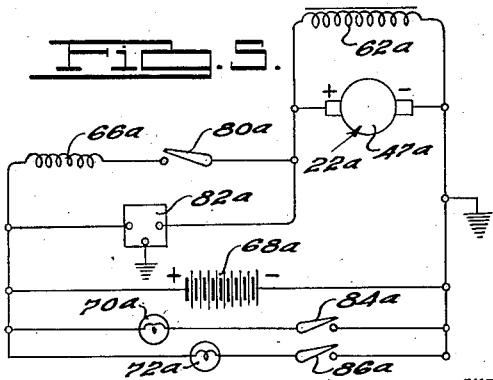
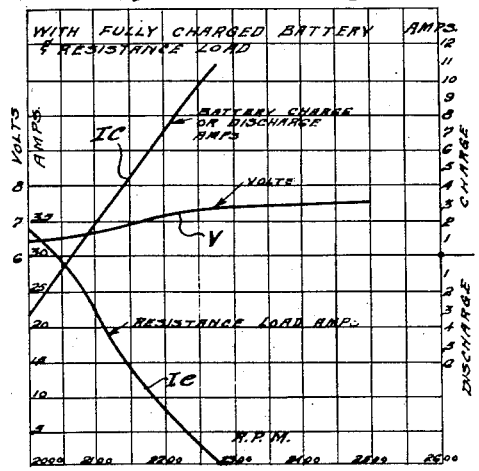
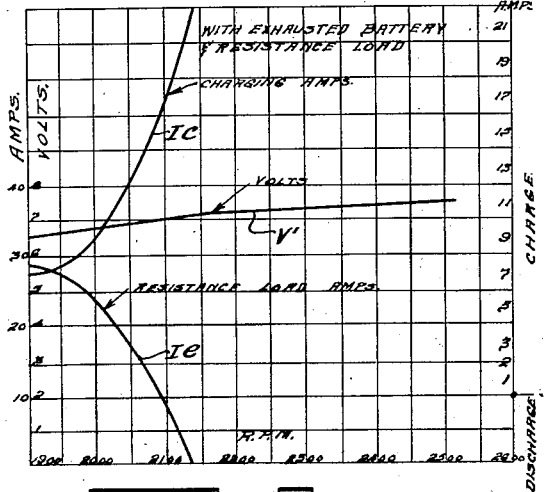
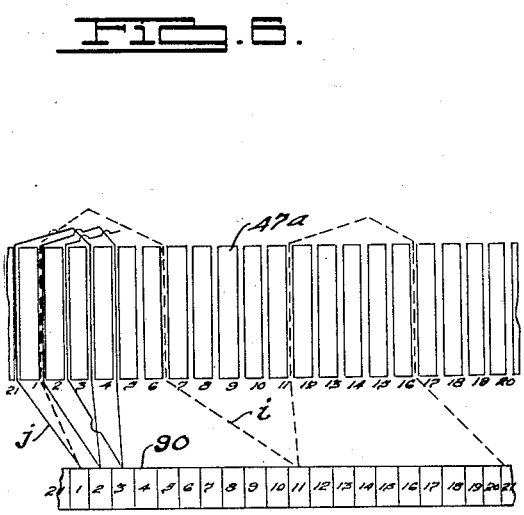
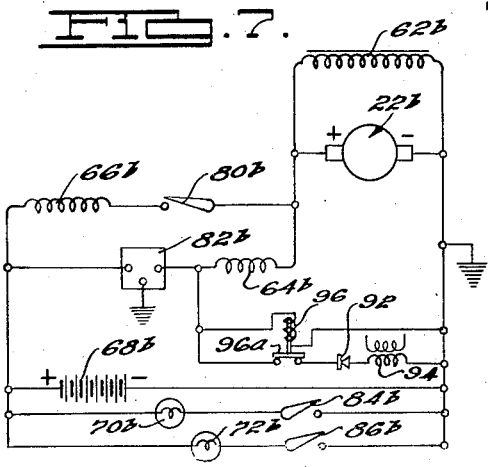
INVENTOR
Harold E. Wilber.
BY
Harness, Dickey, Pierce & Hans
ATTORNEYS.

Patented Nov. 14, 1939

2,180,327

UNITED STATES PATENT OFFICE 2,180,327

CONSTANT VOLTAGE GENERATOR

Harold E. Wilber, Detroit, Mich., assignor, by mesne assignments, to Reconstruction Finance Corporation, Detroit, Mich., a corporation of the United States Application September 19, 1936, Serial No. 101,554

5 Claims. (Cl. 171—312)

The present invention relates generally to systems for generating and distributing electric power, and in particular provides an improved battery charging and distribution system, including an improved construction of direct current generator particularly adapted for use in the system.

Objects of the present invention are to provide an improved battery charging and distribution system of the type in which a generator associated with the system is driven by an internal combustion engine, and in which the output of the generator may be used to charge a battery and also to supply additional distribution circuits; to provide such a system in which for starting purposes, the battery may be rendered effective to drive the generator as a motor to crank the internal combustion engine; to provide such a system in which the generator, the internal combustion engine, and the various control apparatus associated therewith may be embodied in a relatively self-contained unit, which may be economically manufactured, assembled and maintained.

Further objects of the present invention are to provide a system of the above generally stated character embodying an improved construction of direct current generator, having the characteristic of developing a substantially uniform voltage over a wide range of operating speeds and under a relatively wide range of loads; to provide such a generator in which the just mentioned uniform voltage characteristic or close regulation is effected by embodying in the generator a number of separate contributory regulating features; to provide such a generator provided with pole pieces which provide wider air gaps at the pole tips than at the pole centers, embodying a series of fielding winding to alter the generator field excitation in accordance with varying load conditions, and embodying novel armature windings adapted to minimize a rising voltage characteristic in response to increases in the operating speed of the engine.

Other objects of the present invention are to provide a system of the above generally stated character, in which the generator itself acts as a speed governor for the driving engine therefor; to provide such a system embodying improved means for automatically stopping the driving engine in the event the battery to be charged thereby is fully charged and no power is being used in the distribution circuit; to provide such a system in which the stopping means is ineffective so long as current is being used in the distribution circuit; to provide such a system in which the stopping means embodies a relay mechanism responsive to the generator voltage, the actual voltage drop across such mechanism being further controlled in accordance with current conditions in the distribution circuit and voltage conditions in the battery; and to provide such a system in which the stopping relay mechanisms act to interrupt the engine ignition circuit.

With the above and other objects, as well as more specific objects, in view, preferred but illustrative embodiments of the present invention are shown in the accompanying drawings, throughout which corresponding reference characters are used to designate corresponding parts, and in which:

Fig. 4 is a schematic diagram of an illustrative distribution system with which the improved generator of the present invention may be used;

Fig. 5 is a schematic diagram of a control system utilizing a slightly modified construction of generator;

Figs. 6 and 7 are illustrative characteristic curves showing the operating characteristics of the improved generator of the present invention;

Fig. 8 is a developed view of a modified arrangement of armature winding, particularly adaptable for use with the generator shown in connection with Fig. 5; and Fig. 9 is a schematic control diagram showing the improved automatic shut-down mechanism of the present invention.

Figure 1:
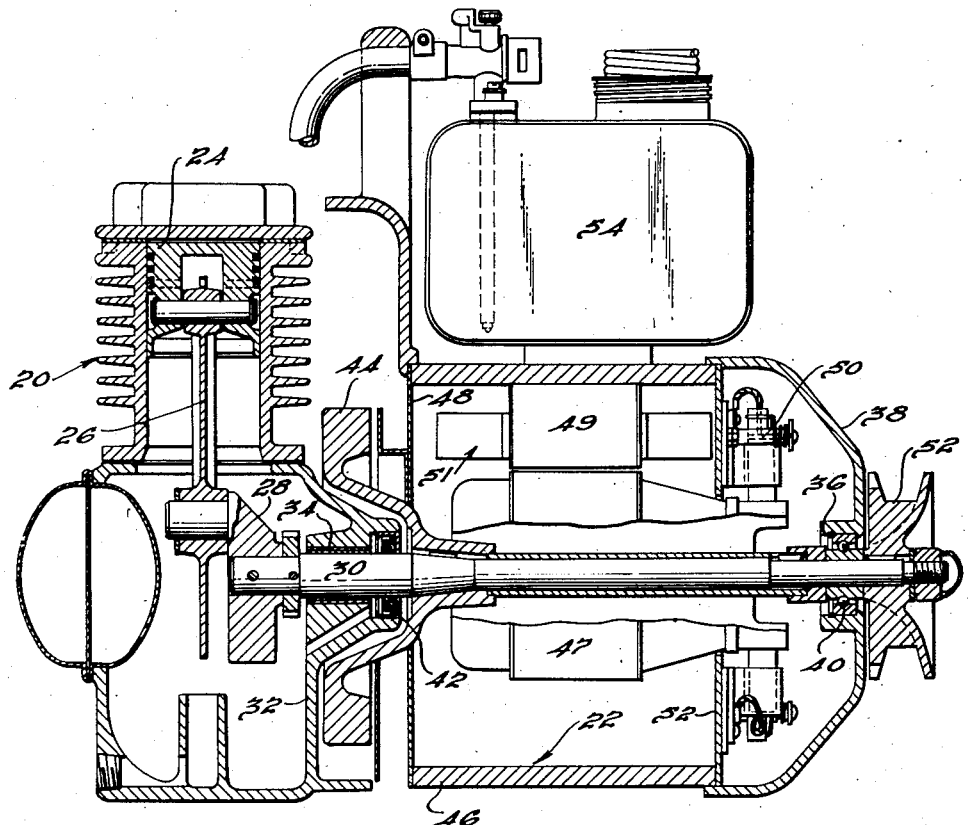
Figure 1 is a view in elevation, partly in section, of the combined engine and generator unit.

Referring first to Fig. 1, the preferred engine and generator unit comprises generally the internal combustion engine, designated as a whole as 20, and the direct current generator, designated as a whole as 22. The engine 20 may be of generally conventional construction, and as illustrated is of the single cylinder type. The piston 24 is vertically reciprocable, and the connecting rod 26 associated therewith is conventionally connected to the offset 28 associated with the crank shaft 30. The crank case housing 32 is formed to provide one bearing 34 for the crank shaft 30, and a second bearing 36 therefor is provided by the end bell 38 associated with the generator 22. The bearing 36 is illustrated as comprising ball bearing elements 40 and the bearing 34 may, if desired, be correspondingly arranged. A suitable packing gland, such as 42, is provided to prevent the escape of lubricant from the crank case along the shaft 30.

A conventional flywheel 44 is keyed to the shaft 30, externally of the crank case 32. The yoke 46 of the generator, of conventionally cylindrical construction, supports four poles 49 in radially spaced relation to the armature 47. Yoke 46 is closed at one end by the cover 48 and is closed at the other end by the previously mentioned end-bell 38. The generator brush assembly designated generally as 50, is suitably secured in circumferentially adjustable relation to a web 52 secured to the one end of the yoke 46 and within the end bell 38. The supply tank 54, for the engine 20, is directly supported by the yoke 46, in a position conveniently adjacent the engine 20.

It is contemplated that in practice ventilating features will be used in connection with the generator 22, but these features form no part of the present invention and in order to simplify the drawings have not been illustrated. Preferably, and as illustrated, the right hand end of the crank shaft 30, as viewed in Fig. 1, is provided with a drive pulley 52, through which engine 20 may drive further apparatus (not shown) in addition to generator 22.

Generator pole formation

Figure 2:
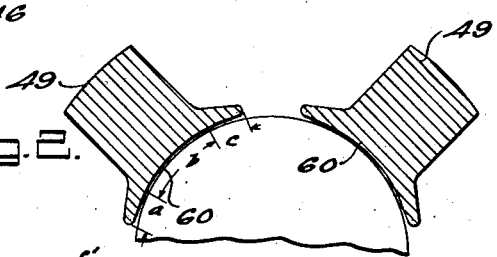
Fig. 2 is a diagrammatic view showing the preferred pole face construction.

Referring now to Fig. 2, the generator 22, is of the four pole type, although it will be appreciated that other numbers of pairs of poles may be used in practice. The four poles 49 are suitably conventionally secured to the yoke 46, and are placed ninety mechanical degrees apart, alternate poles being of the positive sign and the intervening poles being of the negative sign. Preferably also in accordance with conventional practice, the poles 49 are of laminated construction, to minimize the production of eddy currents within the poles.

As set forth in the statement of objects, a feature of the present construction resides in the use in conjunction with the hereinafter described regulating elements, of pole shoes which provide a greater air gap at the pole tips than at the pole centers. The applicant is aware that the use of pole shoes so arranged is broadly old for the purpose of producing a field form of predetermined shape. So far as the present applicant is aware, however, the use of pole shoes of the designated character in conjunction with the hereinafter described elements is new.

It will be appreciated that in practice the precise size of the various pole shoes may vary in accordance with different operating conditions. In the practice of the invention, it is found practicable and satisfactory to so proportion the poles 49 that the faces or shoes 60 thereof are of a width equal to approximately seventy per cent of the pole spacing, which in the illustrated case is 90°. In Fig. 2, each pole shoe 60 is divided into three portions a, b, and c. The central portion c is arcuate and concentric with the armature 47 of the generator, and the portions a and b which are co-extensive, are linear. The portions a and b are formed as tangents to the arc of the intermediate portion c. The portions a and c are one-half the length of the intermediate portion b. With this relation, the air gap at each extreme pole tip is approximately one and one-half times the air gap along the portion b.

With the above described pole face formation, it will be appreciated that the flux density throughout the portion b is of a substantially uniform value and that the flux in the portions a and c is of progressively decreasing density, the portions of minimum density being at the extreme pole tips. The field form which results from the excitation supplied by the windings 51 on each pole (Fig. 1) is substantially symmetrical with respect to the center line of each pole. Preferably, the poles are so proportioned that throughout the expected load range of the machine, the poles remain in an unsaturated condition.

Generator field windings

Referring particularly to Fig. 4, the field windings, designated generally as 51 in Fig. 1, are three in number, and comprise the shunt field windings 62, the regulating series field winding 64, and the starting series field winding 66. The shunt field winding 62 is connected directly across the armature 47 of the generator 22. The regulating series field winding 64 is connected in series with armature 47 of the generator 22 and thus acts to modify the generator field excitation and hence the internal generated voltage in accordance with increases or decreases in the current supplied by generator 22 to the battery 68 and the distribution circuits illustrated as comprising the lamps 70 and 72. The remaining field winding 66, is cumulative and acts, during starting, as hereinafter described, to supply a relatively stiff field and thereby cause the machine 22, as a motor, to suply a relatively high starting torque for cranking purposes. As will be appreciated, the winding 62 is formed of a relatively large number of turns of relatively fine wire, and the windings 66 and 64 are formed of a relatively few turns of relatively heavy wire, since the winding 64 is subjected to the load current of the generator, and the winding 66 is subjected to the starting current of the generator when operating as a motor. The distribution of the three windings 62, 64 and 66 on the field poles 49 may follow conventional practice.

Generator armature and armature winding

Figure 3:
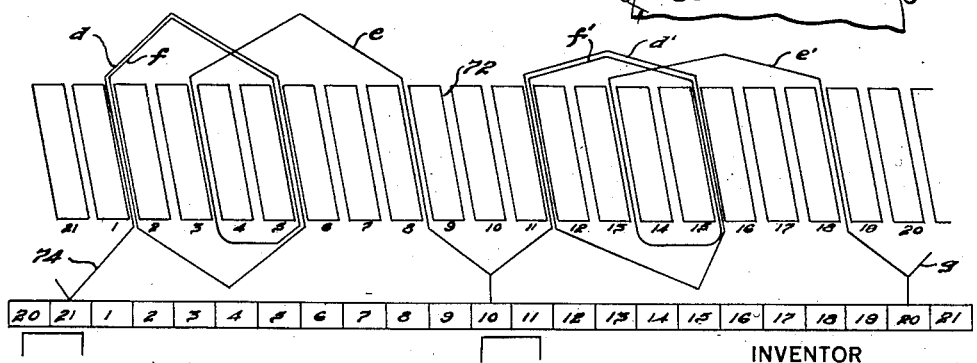
Fig. 3 is a developed view of the preferred armature winding.

Referring particularly to Fig. 3, the armature 47 of the generator 22 is shown in developed form as being of conventional slotted type, the individual slots 72 being disposed on a slight helix angle, and being twenty-one in number. In the broader aspects of the invention, the number of armature slots may be either odd or even but in the preferred construction, an odd number of slots is used.

The armature winding 74, only sufficient turns of which are drawn out in detail to clearly show the winding relation, is in a broad sense, of the wave type. In accordance with the present invention, however, in order to overcome the otherwise usual tendency of the generator to increase its voltage in response to increases in speed of the driving engine 20, the armature circuits, one of which extends, for example, from the segment 21 of the commutator to the segment 10, and the second of which extends from the segment 10 to the segment 20, include coils having both wave and lap characteristics.

Considering the winding relation in more detail, the coils included in the circuit extending between segments 21 and 10 are designated d, e, and f. The two sides of coils d and f lie in slots 1 and 5, respectively, giving these coils a pitch of four slots. One coil side of coil e lies in slot 3 and the other coil side thereof lies in slot 8. The circuit between segments 21 and 10 thus extends from segment 21 through coil d, thence through coil f and thence through coil e to the companion segment 10. The other armature circuit, that connecting segments 10 and 20 includes the coils d', f' and e' arranged in relation to each other in the manner just described with reference to coils d, e and f.

It will be appreciated that the coil g, leading from segment 20 introduces a new armature circuit extending between segments 20 and 9, which corresponds in all respects to the armature circuit extending between segments 21 and 10, with the exception that all coil sides are disposed respectively one slot behind the respective coil sides of the circuit between segments 21 and 10. It will also be appreciated that the complete winding is formed by continuing around the armature with additional coils, in the manner indicated with reference to coils d, e, f, d', e', f' and g, until the armature winding ultimately reconnects upon itself. Through use of an odd number of slots and commutated segments also, it will be appreciated that no dead turns are involved, and that each of the slots accommodates the same number of coil sides. With the winding completed as indicated, a total of 63 coils is provided, and there being, of course, two coil sides per coil, each slot is thus occupied by six coil sides. The distribution of the individual coil sides in the individual slots may vary in accordance with operating conditions and the exact winding routine followed.

Considering now the regulating effect of the armature winding as above described, it will be appreciated that in any direct current generator, the net field flux is made up of at least two components, one of these components being the flux set up by the field windings, and the other component being the cross-magnetizing and de-magnetizing flux set up by the current in the armature conductors themselves. The effect of this second component, known generally as armature reaction, in the case of a generator, is to increase the flux density at each leading pole tip, and to decrease the flux density at each trailing pole tip. Where the brushes are located on the electrical neutral axis, a certain amount of reduction of the net field density results. Where the brushes are slightly advanced, however, a demagnetizing component results, and the net reduction in the field flux is substantially increased. In the present case, it is preferred to slightly advance the brushes in order to introduce this de-magnetizing component.

For a given armature current, therefore, the output voltage of the machine is proportional to the field flux produced by the field windings minus the flux due to armature reaction. In the present case, the effect of armature reaction is very materially increased by arranging the armature winding in the above described manner, since the number of armature conductors in which the current which is producing the armature reaction is flowing is materially increased over the number that would be present in a conventional wave winding.

As stated above, in the preferred embodiment of the present invention, the brushes are shifted slightly in advance of the neutral axis, in order to aggravate or increase the effect of the armature reaction in the machine, which effect is relied upon to control the net field flux of the machine in order to maintain the voltage within the desired limits. Normally, a brush advance in a machine designed for variable load service is disadvantageous because a brush advance which produces good commutation at one load, interferes with good commutation at another load. In the present case, this objectionable feature of brush shifting is obviated by increasing the air gaps at the leading and trailing pole tips as described with reference to Fig. 2.

*Operation as a whole*

Referring now to Fig. 4, the battery charging and distribution system of the present invention may be placed in operation by closing the manually operable starting switch 80, which connects the generator to the battery 68 in series with the starting series field winding 66. Battery 68 thus supplies power to the machine 22 causing it to operate as a motor, the power circuit being from one terminal of the battery 68 through the field winding 66, armature 47 and shunt field winding 62, in parallel, to the other terminal of the battery. Windings 66 and 62 are cumulative under these conditions, thus supplying a strong field to the machine 22, and causing it to develop a sufficiently high torque to crank the engine 20. (Not shown in Fig. 4). As soon as the cranking action causes the engine 20 to drive itself, it assumes an operating speed in excess of the speed at which battery 68 is effective to operate generator 22 as a motor, and thereafter the engine 20 drives generator 22 as a generator. As soon as this action occurs, the starting switch 80 may be opened, excluding the starting winding 66 from the circuit.

The cut-out 82, which may be of conventional construction, is designed to maintain the associated circuit open as long as the voltage of generator 22 is below a predetermined value and to close the associated circuit when the voltage of the generator rises above the predetermined value. It also functions to prevent a flow of current from the battery 68 through the associated circuit. Accordingly, cut-out 82 is normally open, but closes as soon as the engine starts operating on its own power.

Upon closure of cut-out 82, generator 22 becomes effective to supply current to the battery 68 and to the circuits associated with lights 70 and 72, the power circuit being from the positive terminal of the generator 22 through the regulating series field winding 64, cut-out 82, and thence in parallel through the circuit for the battery 68 and the circuits for the lamps 70 and 72 to the negative terminal of the generator.

Due to the electrical governor which the present system provides, as described hereinafter, the speed of the engine in actual operation is found to automatically remain within limits of 15 to 20%, a typical minimum operating speed being 2000 R. P. M. and a typical maximum operating speed being 2300 R. P. M. Witth the generator construction as described above, however, it is found that even though the engine speed is varied between a much wider limit as, for example, between 2000 R. P. M. and 2500 to 2600 R. P. M., the output voltage of the generator remains between six and one-half and seven and one-half volts. These relations are shown in the curves of Figs. 7 and 8, in which the curves V and V' represent the relation between the output voltage of the machine and the speed of the machine. So far as the present applicant is aware, regulation of this degree is a material and substantial improvement.

As to one explanation of the factors which maintain the voltage within the limits just stated, it will be appreciated that an increase in speed of the driving engine tends to cause an increase in the output voltage of the generator which in turn tends to cause an increase in the armature current of the generator. Neglecting the effect of the regulating series field winding 64, however, any increase in the armature current of the machine increases the effect of the armature reaction of the machine, which effect reduces the net field flux of the generator. An increase speed is thus accompanied by a decrease in net field flux for a predetermined load condition, thus retaining the output voltage of the machine at a substantially uniform value. The increase in armature reaction, as previously stated, of substantial enough magnitude to provide the just stated relation, is caused by the armature winding described with reference to Fig. 3, and by advancing the generator brushes The tapered pole shoe formation, in combination with the armature winding, permits the brush advance without adversely affecting the commutating characteristics of the machine.

Considering now the performance of the machine under varying load conditions, it will be appreciated that when the battery 68 is in a relatively discharged state, it presents a relatively lower resistance to the flow of current from the generator 22. Similarly, selective opening and closing of the load switches such as 84 and 86 to selectively light and extinguish the lamps 70 and 72 further varies the total resistance in the circuit of the generator. For a given voltage of the generator, therefore, the generated current may be expected to vary between relatively wide limits due to the varying external load conditions. For example, by reference to Figs. 7 and 8 it may be expected that the external resistance load, (curves Ie), such as is taken by the lamps 70 and 72 may vary between nil and 30 to 35 amperes. Similarly, the charging current taken by the battery, (curves Ic), may vary between nil and 10 to 20 amperes.

As previously stated, for a given externally applied field flux, any increase in armature current increases the armature reaction, which reduces the net field flux by an amount sufficient to maintain the voltage at substantially the predetermined value. In order to maintain the voltage of the generator at the uniform value in response to changes in the armature current which are due to changed conditions in the load circuit accordingly, it is necessary to increase or decrease the externally applied field flux by an amount determined by the change in the load condition. This change is effected by the regulating series field winding 64, which carries the armature current of the generator, and is thus effective to increase the main field flux in response to increases in load current, and to decrease the main field flux in response to decreases in load current. Winding 64 is thus proportioned to maintain the voltage of the generator 22 at substantially a uniform value in response to varying load conditions, and assuming a uniform operating speed of the engine 20. The generator armature winding and pole construction on the other hand is effective to prevent changes in operating speeds of the engine 20 from effecting a corresponding change in the generator voltage.

As to the electrical speed governing feature of the present invention, it will be appreciated that when the generator is running lightly loaded its efficiency is relatively low. That is to say, as the load is removed from the generator, the tendency of the driving engine 22 is to increase its speed. This increase in speed, however, is overcome, as previously described, by the resulting increase in armature reaction, which increase, however, it at the expense of the efficiency of the machine. The lighter the load, accordingly, the less efficient is the machine and consequently the greater horsepower output of the engine per horsepower output of the generator. This reduction in efficiency as the load is lightened of itself tends to maintain the engine speed at a predetermined value. On the other hand, as the load on the generator increases, the required output of the engine 20 is increased which factor tends to reduce the speed thereof. A too great a reduction in this case is resisted by the increase in efficiency of the generator which results from the use of the field winding 64. Under heavily loaded conditions, therefore, the efficiency of the generator is increased. The variation in horsepower output required of the engine 20 is thus much smaller than the variation in horsepower output of the generator 22, and the tendency to varying speeds of the engine is correspondingly less than would be the case were the efficiency of the generator 22 more or less uniform over the entire load range. In practice it has been found that by proper proportioning of the generator design, as hereinbefore described, the generator efficiency may be caused to vary over a sufficiently wide range to maintain the engine 20 at substantially full load at all times. The engine load being substantially uniform, its speed remains correspondingly uniform.

Referring to Fig. 8, an alternative armature winding construction is shown in which the armature 47 is wound with a continuous wave winding $i$ and also with an independent lap winding $j$, each of the twenty-one commutator segments 90 being connected to each of the wave coils and also to each of the lap coils. This winding is found in practice to produce a voltage variation under variable speed conditions which, while not as close as the regulation produced by the armature winding in Fig. 3, is nevertheless close enough for practical operating purposes. This type of armature winding also is found to obviate the need of the series regulating winding 64 of Fig. 4. Where the armature winding of Fig. 9 is used accordingly, it is preferred to use the control system of Fig. 6, which duplicates in all respects the control system of Fig. 4 except that series winding 64 in the latter is omitted.

Referring now to Fig. 9, the control system there shown embodies the improved automatic shut-down feature of the present invention. In all other respects, except the shut-down feature, the control system of Fig. 9 duplicates the control system of Fig. 4 and this relation is indicated by the corresponding reference characters with the sub-script $b$.

In Fig. 9, the ignition circuit of the internal combustion engine for driving generator 22b, and which circuit includes the conventional breaker point 92 and the primary 94 of the usual induction coil, is subject to control by the contacts 96a of a relay 96. The coil of relay 96 is connected in parallel with the battery 68b and the distribution circuits, and in series with the previously described regulating series field winding 64b. The contact 96a of relay 96 is normally closed and the relay is so designed as to open the contact only when the voltage across the winding 96 somewhat exceeds the voltage corresponding to the fully charged condition of the battery 68b.

In operation, closure of the starting switch 80b, as described with reference to Fig. 4, renders the battery 68b effective to drive the generator 22b as a motor for cranking purposes. Closure of the switch 80b also completes the engine ignition circuit which circuit extends from the positive terminal of the battery through the winding 66b, switch 80b, regulating series field winding 64b, normally closed contact 96b, breaker 92, and the primary 94 of the ignition coil to the negative terminal of the battery.

As soon as the engine starts operating under its own power, as described with reference to Fig. 4, the starting switch 80b may be opened excluding the winding 66b from the circuit. The starting of the engine under its own power also drives the generator 22b at a speed in excess of the cranking speed and causes it to generate a voltage high enough to cause the cut-out 82b to close. Upon closure of the cut-out 82b, the generator becomes effective to supply the battery 68b with charging current and also to provide current to the distribution circuits. Generator 22b also impresses a predetermined voltage across the winding 96, tending to cause the contacts thereof to open.

It will be noted that the coil 96 is included in one of a plurality of parallel branches of a circuit which includes as a series element the regulating series field 64b. The voltage drops across each of the parallel branches are always equal, and the balance of the external generated voltage of generator 22b is consumed as a voltage drops across the series regulating winding 64b. The drop across each branch circuit and the drop across winding 64b thus depends upon the effective resistance of each branch circuit and the number of such branch circuits which are closed.

Where, for example both distribution circuits are closed, and battery 68b is in a relatively discharged state, the drop across relay 96 is of a relatively low value. If one or both of the distributions are opened, the resultant increase in total resistance of the load circuit is reflected as an increase in the voltage across the relay 96. The maximum voltage drop across relay 96 is produced when the battery reaches a fully charged condition and both distribution circuits are open. At this maximum voltage relay 96 operates to open the contacts 96a and interrupt the driving engine ignition circuit, thereby stopping the system.

This maximum or operating voltage of relay 96 is not obtained, however, if either or both of the distribution circuits are closed, even though the battery 68b is in the fully charged condition, since closure of a distribution circuit materially reduces the total resistance of the generator load circuit. This reduction in resistance is reflected as an increase in the generator output current which increases the voltage drop across the series field winding 64b and decreases the voltage drop across the winding 96.

Following each starting operation of the system, accordingly, the engine remains in operation as long as any distribution circuit is closed and as long as the voltage of the battery 68b is below the voltage corresponding to a fully charged condition thereof. The stopping of the system on the other hand occurs automatically when the battery reaches a fully charged condition provided no distribution circuits are closed. If at the time the battery reaches the fully charged condition one or more distribution circuits are closed, the engine remains in operation until all distribution circuits are opened, at which time the engine is stopped.

Although specific embodiments of the invention have been shown and described, it will be appreciated that various modifications in the form, number and arrangement of parts may be made within the spirit and scope thereof.

What I claim is:

1. In a dynamo electric machine having an armature and a multipolar field structure, the combination of a winding for said armature of generally wave form having a plurality of coils, the ends whereof are connected to the commutator of said machine, each said coil having first and second coil sides spaced less than 360 electrical degrees apart and having between said coil sides one or more turns of generally lap form.

2. In a dynamo electric machine having an armature and a multipolar field structure, the combination of a winding for said armature of generally wave form having a plurality of coils, the ends whereof are connected to the commutator of said machine, each said coil having first and second coil sides spaced between 180 and 360 electrical degrees apart and having between said coil sides one or more turns of generally lap form, each said lap turn having a pitch substantially less than the spacing between said first and second coil sides.

3. In a dynamo electric machine having a slotted armature and a multipolar field structure, the combination of a winding for said armature of generally wave form having a plurality of coils received in said armature slots and the ends whereof are connected to the commutator of said machine, each said coil having first and second coil sides spaced less than 360 electrical degrees apart and having between said coil sides one or more turns of generally lap form, at least one side of a said lap turn and one of said coil sides lying in the same slot.

4. In a dynamo electric machine having a slotted armature and a multipolar field structure, the combination of a winding for said armature of generally wave form having a plurality of coils received in said armature slots and the ends whereof are connected to the commutator of said machine, each said coil having first and second sides spaced less than 360 electrical degrees apart and having between said coil sides one or more turns of generally lap form, at least one side of a said lap turn and one of said coil sides lying in the same slot, and at least one other side of a said lap turn lying in a slot intermediate the slots which receive said first and second coil sides.

5. In a direct current generator for supplying an associated distribution circuit and adapted to be driven at any of a plurality of operating speeds, and having field poles and windings therefor, an armature, a commutator and brushes engaging said commutator and connected to said circuit, the combination of a winding on said armature wound to produce a substantial armature reaction in relation to the field established by said field windings, said brushes being positioned on said commutator in advance of the electrical neutral of the generator so as to produce a substantial demagnetizing field component in response to said armature reaction which opposes said field, said armature winding being of generally wave form having a plurality of coils the ends of each whereof are connected to said commutator, each said coil having first and second coil sides spaced apart less than 360 electrical degrees and having between said coil sides one or more turns of generally lap form.

HAROLD E. WILBER.